United States Patent
Zhang et al.

(10) Patent No.: US 10,952,227 B2
(45) Date of Patent: Mar. 16, 2021

(54) RESOURCE SCHEDULING METHOD AND APPARATUS

(71) Applicant: Huawei Technologies Co., Ltd., Guangdong (CN)

(72) Inventors: Lili Zhang, Beijing (CN); Richard Stirling-Gallacher, Munich (DE); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 15/578,682

(22) PCT Filed: Jun. 1, 2015

(86) PCT No.: PCT/CN2015/080526
§ 371 (c)(1),
(2) Date: Nov. 30, 2017

(87) PCT Pub. No.: WO2016/192019
PCT Pub. Date: Dec. 8, 2016

(65) Prior Publication Data
US 2018/0152957 A1   May 31, 2018

(51) Int. Cl.
*H04W 72/12*  (2009.01)
*H04W 74/04*  (2009.01)
(Continued)

(52) U.S. Cl.
CPC .......... *H04W 72/1226* (2013.01); *H04B 1/10* (2013.01); *H04B 17/24* (2015.01);
(Continued)

(58) Field of Classification Search
CPC ........... H04W 72/042; H04W 72/0446; H04W 24/10; H04W 24/08; H04W 72/082; H04W 36/0088
See application file for complete search history.

(56) References Cited

U.S. PATENT DOCUMENTS

2011/0250919 A1*  10/2011  Barbieri ............... H04L 1/0028
                                                             455/509
2013/0077582 A1    3/2013  Kim et al.
(Continued)

FOREIGN PATENT DOCUMENTS

CN       102131295 A      7/2011
CN       102281638 A      12/2011
(Continued)

OTHER PUBLICATIONS

Jain et al.; "Practical, Real-time, Full Duplex Wireless"; MobiCom'11; Las Vegas, Nevada; Sep. 19-23, 2011; 12 pages.
(Continued)

*Primary Examiner* — Huy D Vu
*Assistant Examiner* — Bao G Nguyen
(74) *Attorney, Agent, or Firm* — Fish & Richardson P.C.

(57) ABSTRACT

The present invention discloses a resource scheduling method and an apparatus, and is applied to the field of communications technologies. The method includes: receiving, by a terminal UE, a first time division duplex TDD configuration and a second time division duplex TDD configuration; determining the first TDD configuration or the second TDD configuration as a target TDD configuration corresponding to the UE; dividing, based on the target TDD configuration, subframes corresponding to the UE into a first subframe subset, a second subframe subset, and a third subframe subset; and performing channel quality state measurement based on the first subframe subset, the second subframe subset, and the third subframe subset, and reporting a measurement result of the channel quality state measurement to an eNB, so that the eNB schedules a subframe resource according to the measurement result.

11 Claims, 3 Drawing Sheets

(51) Int. Cl.
    *H04B 17/24* (2015.01)
    *H04B 1/10* (2006.01)
    *H04W 24/10* (2009.01)
    *H04W 28/06* (2009.01)
    *H04L 5/14* (2006.01)

(52) U.S. Cl.
    CPC ........... *H04W 24/10* (2013.01); *H04W 28/06* (2013.01); *H04W 72/12* (2013.01); *H04W 74/04* (2013.01); *H04L 5/14* (2013.01)

(56) References Cited

U.S. PATENT DOCUMENTS

| | | | |
|---|---|---|---|
| 2013/0222182 A1* | 8/2013 | Nakasato | H04L 5/0069 |
| | | | 342/368 |
| 2014/0010128 A1* | 1/2014 | He | H04L 1/0026 |
| | | | 370/280 |
| 2014/0133430 A1* | 5/2014 | Yang | H04L 5/0055 |
| | | | 370/329 |
| 2014/0160967 A1 | 6/2014 | Gao et al. | |
| 2014/0204783 A1* | 7/2014 | Lin | H04L 1/1854 |
| | | | 370/252 |
| 2014/0293844 A1 | 10/2014 | Meng | |
| 2014/0334353 A1 | 11/2014 | Wei | |
| 2015/0016239 A1* | 1/2015 | Yi | H04J 11/003 |
| | | | 370/201 |
| 2015/0092762 A1 | 4/2015 | Li et al. | |
| 2015/0358998 A1* | 12/2015 | Golitschek Edler Von Elbwart | H04W 48/16 |
| | | | 370/280 |
| 2016/0044672 A1 | 2/2016 | Quan et al. | |
| 2017/0311319 A1* | 10/2017 | Lee | H04L 5/14 |

FOREIGN PATENT DOCUMENTS

| | | |
|---|---|---|
| CN | 103517421 A | 1/2014 |
| CN | 103650572 A | 3/2014 |
| CN | 104080187 A | 10/2014 |
| CN | 104244319 A | 12/2014 |
| WO | 2014109411 A1 | 7/2014 |
| WO | 2014110801 A1 | 7/2014 |
| WO | 2015024245 A1 | 2/2015 |

OTHER PUBLICATIONS

Choi et al.; "Achieving Single Channel, Full Duplex Wireless Communication"; MobiCom'10; Sep. 20-24, 2010; 12 pages.

Radunovic et al.; "Rethinking Indoor Wireless Mesh Design: Low Power, Low Frequency, Full-duplex"; 2010 Fifth IEEE Workshop on Wireless Mesh Networks (WIMESH 2010); Boston, MA, USA; Jun. 21, 2010; 6 pages.

Everett et al.; "Empowering Full-Duplex Wireless Communication by Exploiting Directional Diversity"; 2011 Conference Record of the Forty Fifth Asilomar Conference on Signals, Systems and Computers (ASILOMAR); Pacific Grove, CA, USA; Nov. 6-9, 2011; 5 pages.

Sahai et al.; "Pushing the limits of Full-duplex: Design and Real-time Implementation"; Rice University technical report; TREE1104; arXiv:1107.0607v1 [cs.NI]; Jul. 4, 2011; 12 pages.

"3rd Generation Partnership Project;Technical Specification Group Radio Access Network;Evolved Universal Terrestrial Radio Access (E-UTRA);Physical layer procedures(Release 12)"; 3GPP TS 36.213 V12.5.0; Mar. 2015; 239 pages.

\* cited by examiner

RESOURCE SCHEDULING METHOD AND APPARATUS

CROSS-REFERENCE TO RELATED APPLICATIONS

This application is a national stage of International Application No. PCT/CN2015/080526, filed on Jun. 1, 2015, which is hereby incorporated by reference in its entirety.

TECHNICAL FIELD

The present invention relates to the field of communications technologies, and in particular, to a resource scheduling method and an apparatus.

BACKGROUND

Radio spectrum resources are not inexhaustible common resources, and are becoming increasingly limited. However, humans impose swelling demands on radio spectrum resources, and competition between various radio technologies and applications becomes increasingly intense. Consequently, radio spectrum resources become increasingly scarce. The prior art provides multiple spectral efficiency improvement manners, specifically including a full-duplex technology.

In the full-duplex technology, a throughput of a wireless system is doubled from an approximately physical perspective, and an innovative effect is produced on a Medium Access Control (Medium access control, MAC) design. Therefore, the wireless system may obtain a higher throughput in the future.

Although the full-duplex technology is theoretically feasible, this concept is considered to be difficult to implement from perspectives of mobile communications and device scheduling. This is because a signal sent by a device penetrates into a receiving chain of the device, resulting in detection of a desired signal.

In addition to the full-duplex technology, there are some other spectral efficiency improvement manners. For example, both a single user multiple-input multiple-output (single-User Multiple-Input Multiple-Output, SU-MIMO) technology and a multi-user multiple-input multiple-output (Multi-User Multiple-Input Multiple-Output, MU-MIMO) technology are solutions for improving spectral efficiency. For example, it is indicated on an $i^{th}$ physical resource block (Physical Resource Block, PRB) in a subframe n (subframe n) that user equipment (User Equipment, UE) transmits a PUSCH in a subframe n+4. At least the following options are provided for an evolved NodeB (Enhanced Node B, eNB) to multiplex a same resource.

Option 1: Uplink transmission of another UE 2 is scheduled on a same resource in a subframe n.

Option 2: Downlink transmission of at least another UE 3 is scheduled on a same resource in a subframe n+4.

Option 3: Downlink transmission of UE 1 is scheduled on a same resource in a subframe n+4.

The option 1 indicates an uplink multi-user multiple-input multiple-output (UL MU-MIMO) technology. In a current Long Term Evolution (Long Term Evolution, LTE) system, spatial multiplexing may be used to improve spectral efficiency, and the UE 1 and the UE 2 need to perform space division to enable the spatial multiplexing. As a receiver, the eNB needs to process inter-flow interference. If there are many UEs in the system, it is expected that a UE pair appropriate for an MU-MIMO operation may be obtained to improve the spectral efficiency.

In the option 2, an eNB side uses full duplexing, though this is still a hardware operation for a UE. To implement the operation in this option, the UE 1 and the UE 3 need to keep away from each other to avoid inter-UE interference. Compared with the option 1, the option 2 has the following advantage: UEs in different link directions can be multiplexed on a same resource. This advantage is embodied as follows: When more downlink data is transmitted in the system, by using the option 2, the eNB may activate, on a physical downlink shared channel (Physical Downlink Shared Channel, PDSCH) resource of a UE, uplink transmission of another UE. A prerequisite is that the two UEs are not close to each other, and a full-duplex capability is introduced on the eNB side.

In the option 3, full duplexing is used on both the eNB side and a UE side. That is, both the eNB and the UE have a self-interference cancellation capability. Compared with the option 2, in the option 3, a same UE may perform uplink transmission and downlink transmission on a same resource. This avoids the inter-UE interference in the option 2, but both the eNB side and the UE side need to have a self-interference cancellation capability. In addition, it should be noted that the option 3 is used only when the UE has both uplink data and downlink data.

In conclusion, resource utilization is limited and a resource waste is caused in a spectral efficiency improvement manner provided in the prior art.

SUMMARY

The present invention provides a resource scheduling method and an apparatus. The method and the apparatus provided in the present invention are used to resolve a problem that resource utilization is limited and a resource waste is caused in a spectral efficiency improvement manner provided in the prior art.

According to a first aspect, a resource scheduling method is provided. The method includes:

receiving, by a terminal UE, a first time division duplex TDD configuration and a second time division duplex TDD configuration, where a quantity of DL subframes in the first TDD configuration is greater than a quantity of DL subframes in the second TDD configuration;

determining the first TDD configuration or the second TDD configuration as a target TDD configuration corresponding to the UE;

dividing, based on the target TDD configuration, subframes corresponding to the UE into a first subframe subset, a second subframe subset, and a third subframe subset, where the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group; and DL services of the UE in the first terminal group are more than DL services of the UE in the second terminal group; and performing channel quality state measurement based on the first subframe subset, the second subframe subset, and the third subframe subset, and reporting a measurement result of the channel quality state measurement to an eNB, so that the eNB schedules a subframe resource according to the measurement result.

With reference to the first aspect, in a first possible implementation, the receiving, by UE, a first time division duplex TDD configuration and a second time division duplex TDD configuration includes:

receiving, by the UE, the first time division duplex TDD configuration and the second time division duplex TDD configuration by using broadcast signaling.

With reference to the first aspect or the first possible implementation of the first aspect, in a second possible implementation, the dividing, based on the target TDD configuration, subframes corresponding to the UE into a first subframe subset, a second subframe subset, and a third subframe subset includes:

identifying, by using the target TDD configuration, a subframe subset corresponding to each of the subframes corresponding to the UE, and dividing, according to the identification based on the target TDD configuration, the subframes corresponding to the UE into the first subframe subset, the second subframe subset, and the third subframe subset; or dividing, by the UE according to the target TDD configuration and a preset rule, the subframes corresponding to the UE into the first subframe subset, the second subframe subset, and the third subframe subset.

With reference to any one of the first aspect, or the first and the second possible implementations of the first aspect, in a third possible implementation, the method further includes:

receiving, by the UE, a terminal group identifier, where the terminal group identifier is used to identify that the UE belongs to the first terminal group or the second terminal group; and the determining the first TDD configuration or the second TDD configuration as a target TDD configuration corresponding to the UE includes:

determining, from the first TDD configuration and the second TDD configuration and based on the terminal group identifier, the target TDD configuration corresponding to the UE.

With reference to the third possible implementation of the first aspect, in a fourth possible implementation, the determining, from the first TDD configuration and the second TDD configuration and based on the terminal group identifier, the target TDD configuration corresponding to the UE includes:

determining, based on the terminal group identifier, that the UE is located in the first terminal group or the second terminal group, where when the UE is located in the first terminal group, the target TDD configuration is the first TDD configuration, or when the UE is located in the second terminal group, the target TDD configuration is the second TDD configuration.

With reference to any one of the first aspect, or the first to the fourth possible implementations of the first aspect, in a fifth possible implementation, the performing channel quality state measurement based on the first subframe subset, the second subframe subset, and the third subframe subset includes:

performing inter-UE interference IUI measurement on the first subframe subset;

performing self-interference cancellation gain measurement on the second subframe subset, where the self-interference cancellation gain is used for a full-duplex operation on a UE side; and performing channel quality indicator CQI measurement on the third subframe subset, where the CQI is used for a general half-duplex operation.

With reference to the fifth possible implementation of the first aspect, in a sixth possible implementation, the method includes:

for terminals that have a full-duplex capability and that are in the first terminal group and the second terminal group, performing self-interference cancellation gain measurement by using a specific subframe in the second subframe subset.

With reference to the sixth possible implementation of the first aspect, in a seventh possible implementation, when the UE is configured to report the self-interference cancellation gain measurement, the reporting a measurement result of the channel quality state measurement to an eNB includes:

for the UE in the second terminal group, reporting the self-interference cancellation gain to the eNB if the reporting is triggered by the eNB;

for the UE in the first terminal group, reporting the self-interference cancellation gain to the eNB when the reporting is triggered by the eNB or a report from a buffer status report BSR system is received; and reporting the self-interference cancellation gain to the eNB when the UE learns a fixed value of an interference cancellation capability within a specific period.

With reference to the fifth possible implementation of the first aspect, in an eighth possible implementation, when a subframe corresponding to the UE in the first terminal group is used for downlink transmission, and a subframe corresponding to the UE in the second terminal group is used for uplink transmission, if the UE is configured to report IUI, the method further includes:

for the UE in the first terminal group, measuring, in a specific subframe in the first subframe subset, a sounding reference signal SRS, a random access RA preamble, a random access preamble sequence, and a demodulation reference signal DMRS; and for the UE located in the second terminal group, sending, in the specific subframe in the first subframe subset, the sounding reference signal SRS, the random access RA preamble, the random access preamble sequence, and the demodulation reference signal DMRS; or for the UE in the first terminal group, measuring, in the specific subframe in the first subframe subset, reference signal received quality RSRQ; and for the UE located in the second terminal group, sending, in the specific subframe in the first subframe subset, a signal to measure a received signal strength indicator RSSI.

With reference to the fifth possible implementation of the first aspect, in a ninth possible implementation, when a subframe corresponding to the UE in the first terminal group is used for uplink transmission, and a subframe corresponding to the UE in the second terminal group is used for downlink transmission, if the UE is configured to report IUI, the method further includes:

for the UE in the second terminal group, measuring, in a specific subframe in the first subframe subset, a sounding reference signal SRS, a random access RA preamble, a random access preamble sequence, and a demodulation reference signal DMRS; and for the UE located in the first terminal group, sending, in the specific subframe in the first subframe subset, the sounding reference signal SRS, the random access RA preamble, the random access preamble sequence, and the demodulation reference signal DMRS; or for the UE in the second terminal group, measuring, in the specific subframe in the first subframe subset, reference signal received quality RSRQ; and for the UE located in the first terminal group, sending, in the specific subframe in the first subframe subset, a signal to measure a received signal strength indicator RSSI.

With reference to any one of the sixth to the ninth possible implementations of the first aspect, in a tenth possible implementation, the specific subframe is a preset default subframe or a subframe determined according to configuration information.

With reference to any one of the first aspect, or the first to the tenth possible implementations of the first aspect, in an eleventh possible implementation, before the scheduling, by the eNB, a subframe resource according to the measurement result, the method further includes: detecting, by the UE, a scheduling grant required for data transmission in a subframe n, where the subframe n is a subframe in the first subframe subset, and the detecting, by the UE, a scheduling grant required for data transmission in a subframe n includes:

if reporting of a self-interference cancellation gain of the subframe n is triggered, for the terminals in the first terminal group and the second terminal group, detecting, in a subframe n-k, whether there is joint-scheduling grant signaling; and if the joint-scheduling grant signaling is detected, performing, on a resource allocated in the subframe n, sending and receiving of a full-duplex service based on the detected joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, and no subframe is scheduled by using joint-scheduling grant signaling, for the terminal in the second terminal group, detecting, in a subframe n-m, whether there is uplink grant signaling; and if the uplink grant signaling is detected, sending, on a resource allocated in the subframe n, an uplink service based on the detected uplink grant signaling, where m is a positive integer greater than or equal to 1; and if reporting of a self-interference cancellation gain of the subframe n is not triggered, and no subframe is scheduled by using the joint-scheduling grant signaling, for the terminal in the first terminal group, detecting, in a subframe n−1, whether there is downlink grant signaling; and if the downlink grant signaling is detected, receiving, on a resource allocated in the subframe n, a downlink service based on the detected downlink grant signaling, where l is an integer greater than or equal to zero.

According to a second aspect, a resource scheduling method is provided. The method includes:

sending, by a base station, a first time division duplex TDD configuration and a second time division duplex TDD configuration to a terminal UE, so that the terminal UE divides, based on the first time division duplex TDD configuration or the second time division duplex TDD configuration, corresponding subframes into a first subframe subset, a second subframe subset, and a third subframe subset, where a quantity of DL subframes in the first TDD configuration is greater than a quantity of DL subframes in the second TDD configuration, the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group; or DL services of the UE in the first terminal group are more than DL services of the UE in the second terminal group; and receiving a measurement result that is obtained by the terminal by performing channel quality state measurement based on the first subframe subset, the second subframe subset, and the third subframe subset, and scheduling a subframe resource according to the measurement result.

With reference to the second aspect, in a first possible implementation, the method further includes:

sending a corresponding terminal group identifier to the UE, where the terminal group identifier is used to identify that the UE belongs to the first terminal group or the second terminal group, so that the UE determines, from the first TDD configuration and the second TDD configuration and based on the terminal group identifier, a target TDD configuration used for dividing the subframes into the first subframe subset, the second subframe subset, and the third subframe subset, where when the UE is located in the first terminal group, the target TDD configuration is the first TDD configuration, or when the is located in the second terminal group, the target TDD configuration is the second TDD configuration.

With reference to the second aspect, in a second possible implementation, the method further includes:

sending indication information to the UE, where the indication information is used to instruct the UE to determine, from the first TDD configuration and the second TDD configuration, a target TDD configuration used for dividing the subframes into the first subframe subset, the second subframe subset, and the third subframe subset.

With reference to the second aspect, in a third possible implementation, the measurement result includes a channel quality state report and a self-interference cancellation gain that are obtained by the first terminal group and the second terminal group for the first subframe subset, the second subframe subset, and the third subframe subset; and the scheduling a subframe resource according to the measurement result includes:

selecting, by the base station, a scheduling policy with maximized spectrum resource utilization according to the received channel quality state report and self-interference cancellation gain, and scheduling the subframe resource by using the scheduling policy.

With reference to the second aspect, in a fourth possible implementation, before the scheduling a subframe resource according to the measurement result, the method further includes: transmitting a scheduling grant required for data transmission in a subframe n, where the subframe n is a subframe in the first subframe subset, and the transmitting a scheduling grant required for data transmission in a subframe n includes:

if reporting of a self-interference cancellation gain of the subframe n is triggered, and sending and receiving of a full-duplex service need to be performed in the subframe n, for the UEs in the first terminal group and the second terminal group, transmitting, in a subframe n-k, joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, joint-scheduling grant signaling is not transmitted, and an uplink service needs to be received in the subframe n, for the UE in the second terminal group, transmitting, in a subframe n-m, uplink grant signaling, where m is a positive integer greater than or equal to 1; and if reporting of a self-interference cancellation gain of the subframe n is not triggered, joint-scheduling grant signaling is not transmitted, and a downlink service needs to be transmitted in the subframe n, for the UE in the first terminal group, transmitting, in a subframe n−1, downlink grant signaling, where l is an integer greater than or equal to zero.

According to a third aspect, a terminal is provided. The terminal UE includes:

a receiver, configured to receive a first time division duplex TDD configuration and a second time division duplex TDD configuration, where a quantity of DL subframes in the first TDD configuration is greater than a quantity of DL subframes in the second TDD configuration;

a processor, configured to: determine, from the first TDD configuration and the second TDD configuration, a target TDD configuration corresponding to the terminal; divide, based on the target TDD configuration, subframes corresponding to the UE into a first subframe subset, a second subframe subset, and a third subframe subset; and perform channel quality state measurement based on the first subframe subset, the second subframe subset, and the third subframe subset, where the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group; and DL services of the UE in the first terminal group are more than DL services of the UE in the second terminal group; and a transmitter, configured to report a measurement result of the channel quality state measurement to an eNB, so that the eNB schedules a subframe resource according to the measurement result.

With reference to the third aspect, in a first possible implementation, the receiver is specifically configured to receive the first time division duplex TDD configuration and the second time division duplex TDD configuration by using broadcast signaling.

With reference to the third aspect or the first possible implementation of the first aspect, in a second possible implementation, the processor is further configured to: divide, according to identification based on the target TDD configuration, the subframes corresponding to the terminal into the first subframe subset, the second subframe subset, and the third subframe subset, where the target TDD configuration identifies a subframe subset corresponding to each of the subframes corresponding to the UE; or divide, according to the target TDD configuration and a preset rule, the subframes corresponding to the UE into the first subframe subset, the second subframe subset, and the third subframe subset.

With reference to any one of the third aspect, or the first and the second possible implementations of the first aspect, in a third possible implementation, the receiver is further configured to receive a terminal group identifier, where the terminal group identifier is used to identify that the terminal belongs to the first terminal group or the second terminal group; and the processor is further configured to determine, from the first TDD configuration and the second TDD configuration and based on the terminal group identifier, the target TDD configuration corresponding to the UE.

With reference to the third possible implementation of the third aspect, in a fourth possible implementation, the processor is further configured to determine, based on the terminal group identifier, that the UE is located in the first terminal group or the second terminal group, where when the UE is located in the first terminal group, the target TDD configuration is the first TDD configuration, or when the UE is located in the second terminal group, the target TDD configuration is the second TDD configuration.

With reference to any one of the third aspect, or the first to the fourth possible implementations of the first aspect, in a fifth possible implementation, that the processor is configured to perform channel quality state measurement based on the first subframe subset, the second subframe subset, and the third subframe subset specifically includes:

the processor is configured to: perform inter-UE interference IUI measurement on the first subframe subset;

perform self-interference cancellation gain measurement on the second subframe subset, where the self-interference cancellation gain is used for a full-duplex operation on a UE side; and perform channel quality indicator CQI measurement on the third subframe subset, where the CQI is used for a general half-duplex operation.

With reference to the fifth possible implementation of the third aspect, in a sixth possible implementation, the processor is further configured to: for terminals that have a full-duplex capability and that are in the first terminal group and the second terminal group, perform self-interference cancellation gain measurement by using a specific subframe in the second subframe subset.

With reference to the sixth possible implementation of the third aspect, in a seventh possible implementation, the transmitter is further configured to: when the UE is configured to report the self-interference cancellation gain measurement, for the UE in the second terminal group, report the self-interference cancellation gain to the eNB if the reporting is triggered by the eNB; for the UE in the first terminal group, report the self-interference cancellation gain to the eNB when the reporting is triggered by the eNB or a report from a buffer status report BSR system is received; and report the self-interference cancellation gain to the eNB when the terminal learns a fixed value of an interference cancellation capability within a specific period.

With reference to the fifth possible implementation of the third aspect, in an eighth possible implementation, the transmitter is further configured to: when a subframe corresponding to the UE in the first terminal group is used for downlink transmission, and a subframe corresponding to the UE in the second terminal group is used for uplink transmission, if the UE is configured to report IUI, for the UE in the first terminal group, measure, in a specific subframe in the first subframe subset, a sounding reference signal SRS, a random access RA preamble, a random access preamble sequence, and a demodulation reference signal DMRS; and for the UE located in the second terminal group, send, in the specific subframe in the first subframe subset, the sounding reference signal SRS, the random access RA preamble, the random access preamble sequence, and the demodulation reference signal DMRS; or for the UE in the first terminal group, measure, in the specific subframe in the first subframe subset, reference signal received quality RSRQ; and for the UE located in the second terminal group, send, in the specific subframe in the first subframe subset, a signal to measure a received signal strength indicator RSSI.

With reference to the fifth possible implementation of the third aspect, in a ninth possible implementation, the transmitter is further configured to: when a subframe corresponding to the UE in the first terminal group is used for uplink transmission, and a subframe corresponding to the UE in the second terminal group is used for downlink transmission, if the UE is configured to report IUI, for the UE in the second terminal group, measure, in a specific subframe in the first subframe subset, a sounding reference signal SRS, a random access RA preamble, a random access preamble sequence, and a demodulation reference signal DMRS; and for the UE located in the first terminal group, send, in the specific subframe in the first subframe subset, the sounding reference signal SRS, the random access RA preamble, the random access preamble sequence, and the demodulation reference signal DMRS; or for the UE in the second terminal group, measure, in the specific subframe in the first subframe subset, reference signal received quality RSRQ; and for the UE located in the first terminal group, send, in the specific subframe in the first subframe subset, a signal to measure a received signal strength indicator RSSI.

With reference to any one of the sixth to the ninth possible implementations of the third aspect, in a tenth possible implementation, the transmitter is further configured to use a preset default subframe or a subframe determined according to configuration information, as the specific subframe.

With reference to any one of the first aspect, or the first to the tenth possible implementations of the third aspect, in an eleventh possible implementation, the processor is further configured to detect a scheduling grant required for data transmission in a subframe n, where the subframe n is a subframe in the first subframe subset, and that the processor is further configured to detect a scheduling grant required for data transmission in a subframe n specifically includes:

the processor is configured to: if reporting of a self-interference cancellation gain of the subframe n is triggered, for the terminals in the first terminal group and the second terminal group, detect, in a subframe n-k, whether there is joint-scheduling grant signaling; and if the joint-scheduling grant signaling is detected, perform, on a resource allocated in the subframe n, sending and receiving of a full-duplex service based on the detected joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, and no subframe is scheduled by using joint-scheduling grant signaling, for the terminal in the second terminal group, detect, in a subframe n-m, whether there is uplink grant signaling; and if the uplink grant signaling is detected, send, on a resource allocated in the subframe n, an uplink service based on the detected uplink grant signaling, where m is a positive integer greater than or equal to 1; and if reporting of a self-interference cancellation gain of the subframe n is not triggered, and no subframe is scheduled by using the joint-scheduling grant signaling, for the terminal in the first terminal group, detect, in a subframe n-l, whether there is downlink grant signaling; and if the downlink grant signaling is detected, receive, on a resource allocated in the subframe n, a downlink service based on the detected downlink grant signaling, where l is an integer greater than or equal to zero.

According to a fourth aspect, a base station is provided. The base station includes:

a transmitter, configured to send a first time division duplex TDD configuration and a second time division duplex TDD configuration to a terminal UE, so that the terminal UE divides, based on the first time division duplex TDD configuration or the second time division duplex TDD configuration, corresponding subframes into a first subframe subset, a second subframe subset, and a third subframe subset, where a quantity of DL subframes in the first TDD configuration is greater than a quantity of DL subframes in the second TDD configuration, the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group; and DL services of the UE in the first terminal group are more than DL services of the UE in the second terminal group;

a receiver, configured to receive a measurement result that is obtained by the terminal by performing channel quality state measurement based on the first subframe subset, the second subframe subset, and the third subframe subset; and a processor, configured to schedule a subframe resource according to the measurement result.

With reference to the fourth aspect, in a first possible implementation, the transmitter is further configured to send a corresponding terminal group identifier to the UE, where the terminal group identifier is used to identify that the UE belongs to the first terminal group or the second terminal group, so that the UE determines, from the first TDD configuration and the second TDD configuration and based on the terminal group identifier, a target TDD configuration used for dividing the subframes into the first subframe subset, the second subframe subset, and the third subframe subset, where when the UE is located in the first terminal group, the target TDD configuration is the first TDD configuration, or when the is located in the second terminal group, the target TDD configuration is the second TDD configuration.

With reference to the fourth aspect, in a second possible implementation, the transmitter is further configured to send indication information to the UE, where the indication information is used to instruct the UE to determine, from the first TDD configuration and the second TDD configuration, a target TDD configuration used for dividing the subframes into the first subframe subset, the second subframe subset, and the third subframe subset.

With reference to the fourth aspect, in a third possible implementation, the measurement result includes a channel quality state report and a self-interference cancellation gain that are obtained by the first terminal group and the second terminal group for the first subframe subset, the second subframe subset, and the third subframe subset; and the processor is specifically configured to: select a scheduling policy with maximized spectrum resource utilization according to the received channel quality state report and self-interference cancellation gain, and schedule the subframe resource by using the scheduling policy.

With reference to the fourth aspect, in a fourth possible implementation, the processor is further configured to: before scheduling the subframe resource according to the measurement result, transmit a scheduling grant required for data transmission in a subframe n, where the subframe n is a subframe in the first subframe subset, and that the processor is configured to transmit a scheduling grant required for data transmission in a subframe n includes:

the processor is configured to: if it is determined that reporting of a self-interference cancellation gain of the subframe n is triggered, and sending and receiving of a full-duplex service need to be performed in the subframe n, for the UEs in the first terminal group and the second terminal group, the transmitter is further configured to transmit, in a subframe n-k, joint-scheduling grant signaling, where the joint-scheduling grant signaling is used for uplink and downlink scheduling in a full-duplex operation, and k is a positive integer greater than or equal to 1; or the processor is configured to: if it is determined that reporting of a self-interference cancellation gain of the subframe n is not triggered, joint-scheduling grant signaling is not transmitted, and an uplink service needs to be received in the subframe n, for the UE in the second terminal group, the transmitter is further configured to transmit, in a subframe n-m, uplink grant signaling, where m is a positive integer greater than or equal to 1; and the processor is configured to: if it is determined that reporting of a self-interference cancellation gain of the subframe n is not triggered, joint-scheduling grant signaling is not transmitted, and a downlink service needs to be transmitted in the subframe n, for the UE in the first terminal group, the transmitter is further configured to transmit, in a subframe n-l, downlink grant signaling, where l is an integer greater than or equal to zero.

One or two of the foregoing technical solutions have at least the following technical effect:

The resource scheduling method provided in the embodiments of the present invention is based on an eNB/UE capability, a flow condition, and interference, so that the eNB implements adaptive resource sharing, thereby improving resource utilization.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to the accompanying drawings of this specification.

Embodiment 1

Figure 1:
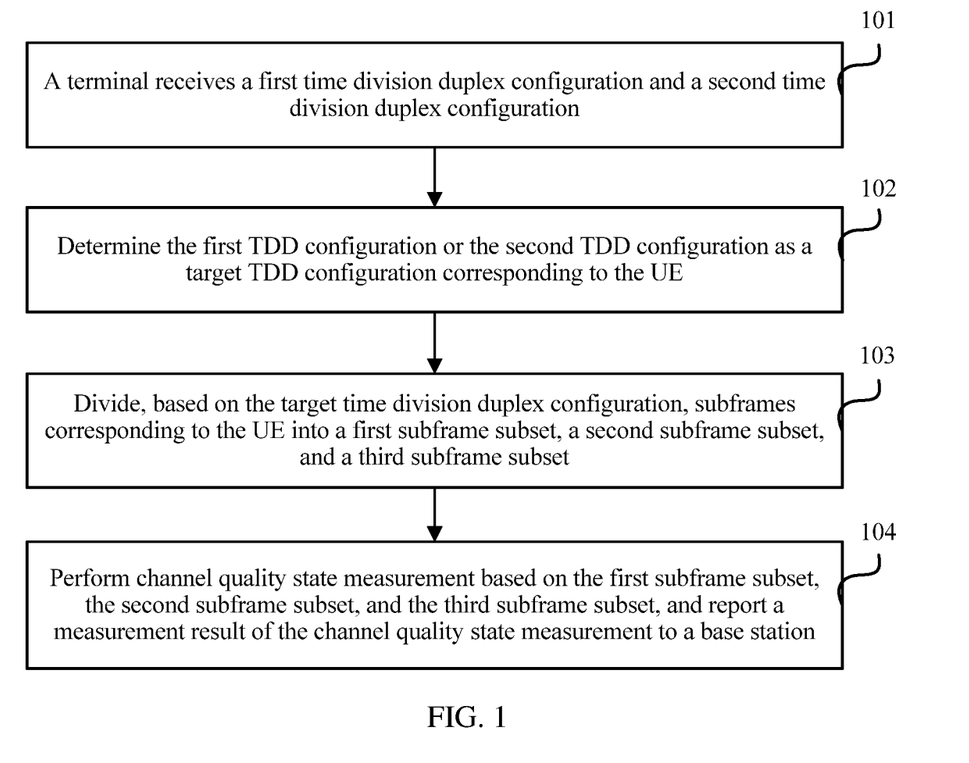
FIG. 1 is a schematic flowchart of a resource scheduling method according to an embodiment of the present invention.

As shown in FIG. 1, this embodiment of the present invention provides a resource scheduling method. The method includes the following steps.

Step 101: A terminal receives a first time division duplex (Time Division Duplexing, TDD) configuration and a second time division duplex TDD configuration.

A quantity of downlink (Downlink, DL) subframes in the first TDD configuration is greater than a quantity of DL subframes in the second TDD configuration. Specific cases include:

A. In the first TDD configuration, the quantity of downlink DL subframes is greater than a quantity of uplink (Uplink, UL) subframes; and in the second TDD configuration, the quantity of DL subframes is less than a quantity of UL subframes. B. In the first TDD configuration, the quantity of downlink DL subframes is far greater than a quantity of uplink UL subframes; and in the second TDD configuration, the quantity of DL subframes is greater than a quantity of UL subframes. C. In the first TDD configuration, the quantity of downlink DL subframes is less than a quantity of uplink UL subframes; and in the second TDD configuration, the quantity of DL subframes is far less than a quantity of UL subframes.

In addition, a manner in which the terminal UE receives the first time division duplex TDD configuration, the second time division duplex TDD configuration, and a terminal group identifier may be:

receiving, by the terminal UE, the first time division duplex TDD configuration and the second time division duplex TDD configuration by using broadcast signaling.

Step 102: Determine the first TDD configuration or the second TDD configuration as a target TDD configuration corresponding to the UE.

In this embodiment, the terminal may select the target TDD configuration according to a locally pre-stored rule or according to received indication information. In this embodiment, if terminals are divided into a first terminal group and a second terminal group, and DL services of UEs in the first terminal group are more than DL services of UEs in the second terminal group (specific implementations may be: A. In the first terminal group, the DL services of the UEs are more than UL services of the UEs; and in the second terminal group, UL services of the UEs are more than the DL services of the UEs. B. In the first terminal group, the DL services of the UEs are much more than UL services of the UEs; and in the second terminal group, UL services of the UEs are more than the DL services of the UEs. C. In the first terminal group, the DL services of the UEs are less than UL services of the UEs; and in the second terminal group, UL services of the UEs are much less than the DL services of the UEs), the indication information may be a received terminal group identifier.

The UE may receive the terminal group identifier by using dedicated signaling. Optionally, the terminal group identifier includes an identifier of a group or an identifier of each UE in a group. For example, UE 1 belongs to the first terminal group, and the first terminal group further includes other UEs (such as UE 2, UE 3, and UE 4). In this case, the group identifier may be a group identifier of the first terminal group, or may be an identifier of each UE in the first terminal group.

In a specific application scenario, the UE may determine, from the first TDD configuration and the second TDD configuration and based on the terminal group identifier, the target TDD configuration corresponding to the UE. A specific implementation may be:

determining that the UE is located in the first terminal group or the second terminal group, where when the UE is located in the first terminal group, the target TDD configuration is the first TDD configuration, or when the UE is located in the second terminal group, the target TDD configuration is the second TDD configuration.

Step 103: Divide, based on the target TDD configuration, subframes corresponding to the UE into a first subframe subset, a second subframe subset, and a third subframe subset.

The first subframe subset includes subframes that are opposite to directions of links corresponding to UEs in a first terminal group and a second terminal group. The second subframe subset includes uplink subframes corresponding to the UEs in the first terminal group and the second terminal group. The third subframe subset includes downlink subframes corresponding to the UEs in the first terminal group and the second terminal group.

Step 104: Perform channel quality state measurement based on the first subframe subset, the second subframe subset, and the third subframe subset, and report a measurement result of the channel quality state measurement to an eNB, so that the eNB schedules a subframe resource according to the measurement result.

In this embodiment of the present invention, the subframes are divided into three subsets according to a characteristic of service transmission, so as to perform corresponding channel measurement for different subsets. A specific implementation in which the UE divides the subframes into three subsets may be as follows:

1. The eNB directly indicates a specific division rule, and the UE directly divides the subframes according to the indication of the eNB, so as to implement:

identifying, by using the target TDD configuration, a subframe subset corresponding to each of the subframes corresponding to the UE, and dividing, according to the identification based on the target TDD configuration, the subframes corresponding to the UE into the first subframe subset, the second subframe subset, and the third subframe subset.

2. The UE deduces a specific division rule according to a specific rule, and an implementation may be:

dividing, by the UE according to the target TDD configuration and a preset rule, the subframes corresponding to the UE into the first subframe subset, the second subframe subset, and the third subframe subset.

Further, the performing channel quality state measurement based on the first subframe subset, the second subframe subset, and the third subframe subset specifically includes the following.

A. Perform inter-UE interference (Inter-Ue Interference, IUI) measurement on the first subframe subset.

When a subframe corresponding to the UE in the first terminal group is used for downlink transmission, and a subframe corresponding to the UE in the second terminal group is used for uplink transmission, if the UE is configured to report IUI, reporting of the IUI may be implemented according to the following specific principles:

A1. For the UE in the first terminal group, a sounding reference signal (Sounding Reference Signal, SRS), a random access (Random Access, RA) preamble, a random access preamble sequence, and a demodulation reference signal DMRS are measured in a specific subframe in the first subframe subset; and for the UE located in the second terminal group, the sounding reference signal SRS, the random access RA preamble, the random access preamble sequence, and the demodulation reference signal (De Modulation Reference Signal, DMRS) are sent in the specific subframe in the first subframe subset.

The SRS, the random access preamble, the random access preamble sequence, and the demodulation reference signal may be explicitly configured.

Alternatively, the eNB indicates only a frequency resource and a sequence that is used, but may not indicate a subframe. A subframe may be implicitly pre-learned by the UE by using a subframe subset, for example, a first subframe in the first subframe subset.

Alternatively, a resource used for an SRS/random access channel (Random Access Channel, RACH) may be implicitly linked to a terminal identifier (UE ID) allocated to the second terminal group.

A2. For the UE in the first terminal group, reference signal received quality (Reference Signal Received Quality, RSRQ) is measured in the specific subframe in the first subframe subset; and for the UE located in the second terminal group, a signal is sent in the specific subframe in the first subframe subset, for use by the UE in the first terminal group to measure a received signal strength indicator (Received Signal Strength Indication, RSSI).

The specific subframe in this embodiment may be a preset default subframe, or may be a subframe determined according to configuration information. For example, a first subframe in the first subframe subset is set as the specific subframe by default.

Optionally, when a subframe corresponding to the UE in the first terminal group is used for uplink transmission, and a subframe corresponding to the UE in the second terminal group is used for downlink transmission, if the UE is configured to report IUI, the method further includes:

A3. For the UE in the second terminal group, a sounding reference signal SRS, a random access RA preamble, a random access preamble sequence, and a demodulation reference signal DMRS are measured in a specific subframe in the first subframe subset; and for the UE located in the first terminal group, the sounding reference signal SRS, the random access RA preamble, the random access preamble sequence, and the demodulation reference signal DMRS are sent in the specific subframe in the first subframe subset; or A4. For the UE in the second terminal group, reference signal received quality RSRQ is measured in the specific subframe in the first subframe subset; and for the UE located in the first terminal group, a signal is sent in the specific subframe in the first subframe subset, for being used to measure a received signal strength indicator RSSI.

B. Perform self-interference cancellation gain reporting on the second subframe subset, where the self-interference cancellation gain is used for a full-duplex operation on a UE side; and for terminals that have a full-duplex capability and that are in the first terminal group and the second terminal group, perform self-interference cancellation gain measurement by using the second subframe subset.

When the UE is configured to report the self-interference cancellation gain measurement, the reporting a measurement result of the channel quality state measurement to an eNB may be implemented according to the following principles:

B1. For the UE in the second terminal group, self-interference cancellation gain is reported to the eNB if the reporting is triggered by the eNB.

B2. For the UE in the first terminal group, the self-interference cancellation gain is reported to the eNB when the reporting is triggered by the eNB or a report from a buffer status report (Buffer Status Report, BSR) system is received.

B3. The self-interference cancellation gain is reported to the eNB when the UE learns a fixed value of an interference cancellation capability within a specific period.

C. Perform channel quality indicator (Channel Quality Indicator, CQI) measurement on the third subframe subset, where the CQI is used for a general half-duplex operation.

For UEs located in the two groups, measurement is restricted in the third subframe set.

When the eNB schedules the subframe resource according to the measurement result, the user equipment UE further performs scheduling grant detection on a subframe n in the first subframe subset. In this embodiment of the present invention, because the subframes are divided into different subsets, different resources are used in different manners, and a full-duplex operation is performed, scheduling information detection may be different, and some scheduling information needs to be detected in advance. Therefore, before the scheduling, by the eNB, a subframe resource according to the measurement result, the method further includes: detecting, by the UE, a scheduling grant required for data transmission in a subframe n, where the subframe n is a subframe in the first subframe subset, and the detecting, by the UE, a scheduling grant required for data transmission in a subframe n specifically includes:

if reporting of a self-interference cancellation gain of the subframe n is triggered, for the terminals in the first terminal group and the second terminal group, detecting, in a subframe n-k, whether there is joint-scheduling grant signaling; and if the joint-scheduling grant signaling is detected, performing, on a resource allocated in the subframe n, sending and receiving of a full-duplex service based on the detected joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, and no subframe is scheduled by using joint-scheduling grant signaling, for the terminal in the second terminal group, detecting, in a subframe n-m, whether there is uplink grant signaling; and if the uplink grant signaling is detected, sending, on a resource allocated in the subframe n, an uplink service based on the detected uplink grant signaling, where m is a positive integer greater than or equal to 1; and if reporting of a self-interference cancellation gain of the subframe n is not triggered, and no subframe is scheduled by using the joint-scheduling grant signaling, for the terminal in the first terminal group, detecting, in a subframe n-l, whether there is downlink grant signaling; and if the downlink grant signaling is detected, receiving, on a resource allocated in the subframe n, a downlink service based on the detected downlink grant signaling, where l is an integer greater than or equal to zero.

Embodiment 2

With reference to a specific usage scenario and example, a method provided in this embodiment of the present invention may be applied to a frequency division duplex (Frequency Division Duplexing, FDD) system and a time division duplex (time division duplexing, TDD) system for resource scheduling. With reference to specific examples, the following further describes the method in the present invention, which specifically includes the following.

Figure 2:
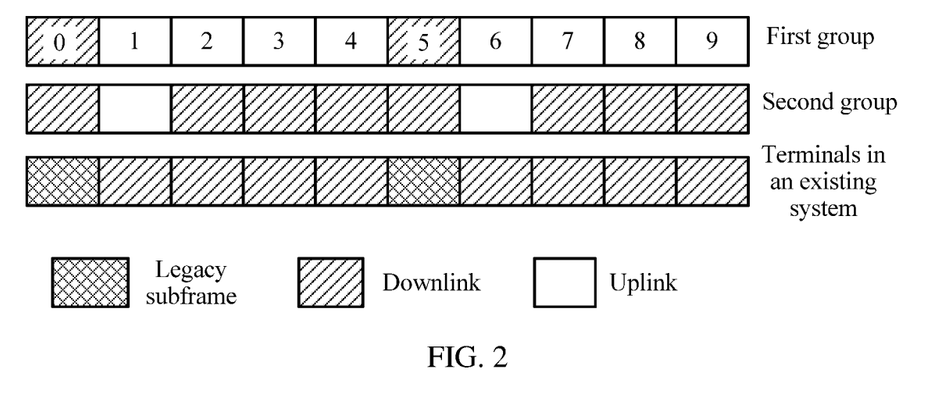
FIG. 2 is a schematic diagram of a first subframe configuration.
Figure 3:
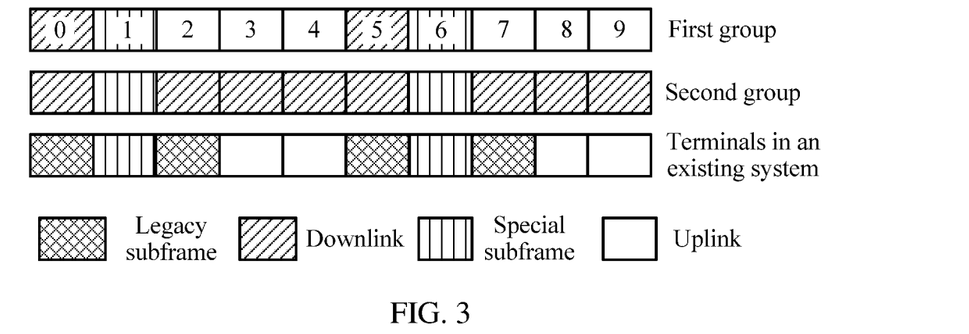
FIG. 3 is a schematic diagram of a second subframe configuration.

Manner 1: Resource scheduling in FDD may be specifically implemented as follows:

FIG. 2 shows a subframe configuration of terminals. The terminals are divided into two groups (a first group and a second group), the first group has more uplink services (as shown in FIG. 2, a subframe configuration is DUUUU, where D represents downlink, and U represents uplink), and the second group has more downlink services (as shown in FIG. 2, a subframe configuration is DUDDD, where D represents downlink, and U represents uplink). To prevent a UE in an existing system (that is, a legacy UE, where the legacy UE does not have a new capability) from being affected, the legacy UE is restricted to be scheduled only on some subframes that are denoted as legacy (that is, legacy subframes). There is no inter-UE interference on these subframes, and a CSI measurement subset may be configured for the legacy UE to obtain an accurate CSI report. In this example, because a subframe 0 is allocated to a downlink subframe subset (that is, the third subframe subset in Embodiment 1), the UE measures, in the subframe 0, a CQI;

because a subframe 1 is allocated to an uplink subframe subset (that is, the second subframe subset in Embodiment 1), the UE measures, in the subframe 1, a self-interference cancellation gain, but for UEs in two groups, triggering of reporting of the self-interference cancellation gain is different; and because a subframe 2 (the subframe 2 is used for uplink transmission in the first group, and is used for downlink transmission in the second group) is allocated to uplink and downlink subframe subsets, a UE in the second group sends, in the subframe 2, an SRS/RA preamble code/sequence/DMRS, and a UE in the first group measures inter-UE interference. A UE that is severely interfered with may be identified by means of detecting an ID of the SRS/RA sequence, so that an eNB obtains paired interference from a UL measurement report.

If the self-interference cancellation gain is reported, the UE detects, k (ms) in advance, a joint-scheduling grant for subframes 2 to 4.

If the joint grant for the subframes 2 to 4 is not detected, the UE in the first group tries its best to detect a UL grant, and the UE in the second group tries its best to detect a downlink grant for the subframes 2 to 4.

Figure 5:
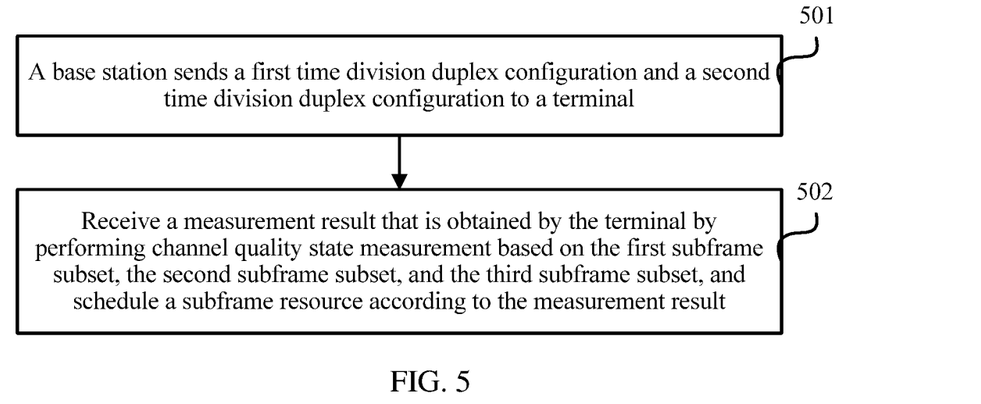
FIG. 5 is a schematic flowchart of a resource scheduling method according to Embodiment 3 of the present invention.

Manner 2: Resource scheduling in TDD may be specifically implemented as follows:

FIG. 5 shows allocation of subframes corresponding to terminals (the terminals are divided into a first group and a second group). Terminals in the first group have more uplink services (a subframe configuration is DSUUUDSUUUD-SUUU, where D represents downlink, and U represents uplink), and terminals in the second group have more downlink services (a subframe configuration is DSUDDDSDDDDSDDD, where D represents downlink, and U represents uplink). In addition, a subframe configuration corresponding to a legacy UE is DSUUUDSUUUD-SUUU. In this case, a specific implementation of the solution provided in this embodiment of the present invention may be as follows:

UEs measure, in a subframe 0, a CQI (the CQI is a CQI without inter-UE interference).

UEs measure, in a subframe 2, a self-interference cancellation gain, but triggering of reporting in the two groups is different.

The UE located in the first group sends, in a subframe 3, an SRS/RA preamble code/sequence/DMRS, and the UE in the second group measures inter-UE interference IUI. A UE that is severely interfered with may be identified by means of detecting an ID of the SRS/RA sequence, so that an eNB obtains paired interference from a UL measurement report.

If the self-interference cancellation gain is reported, the UE detects, k (ms) in advance, a joint-scheduling grant for subframes 3 and 4.

If the joint grant for the subframes 3 and 4 is not detected, the UE in the first group tries its best to detect a UL grant, and the UE in the second group tries its best to detect a downlink grant for the subframes 3 and 4.

Figure 4:
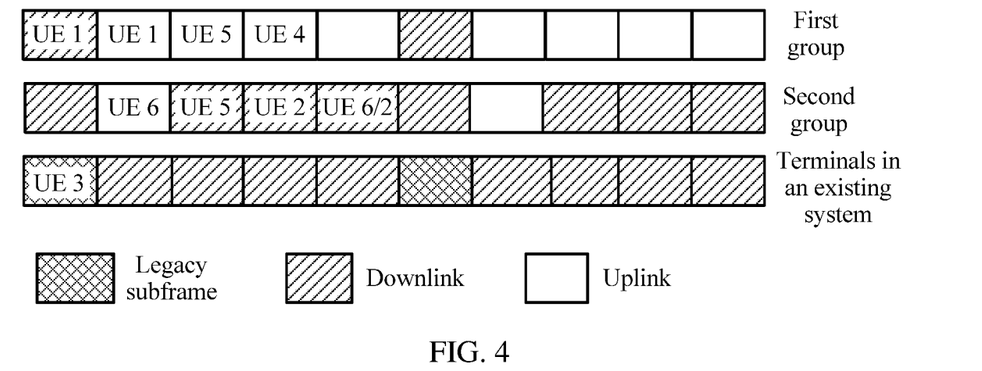
FIG. 4 is a schematic diagram of subframe usage after resource scheduling is performed by using a method according to an embodiment of the present invention.

After detection in the manner 1 and detection in the manner 2, the eNB may schedule a resource block (Physical Resource Block, PRB) I according to the measurement result, and a specific scheduling result may be as follows (shown in FIG. 4):

In a subframe 0, the PRB i is scheduled as DL for UE 1 and UE 3, so as to form DL MIMO;

in a subframe 1, the PRB i is scheduled as UL for the UE 1 and UE 6, so as to form UL MIMO;

in a subframe 2, the PRB i is scheduled as both DL and UL for UE 5, so that both the UE and the eNB use full duplexing;

in a subframe 3, the PRB i is scheduled as UL for UE 4, and scheduled as DL for UE 2, and this requires full duplexing only on an eNB side; and in a subframe 4, the PRB i is scheduled as DL for the UE 2 and UE 6, so as to form DL MIMO.

In this embodiment, there are multiple resource sharing solutions for selection, so that spectral efficiency of each subframe is improved. This dynamic selection is implemented by means of specific measurement on a subframe/subset.

Embodiment 3

As shown in FIG. 5, this embodiment of the present invention further provides another resource scheduling method. The method specifically includes the following steps.

Step 501: A base station sends a first time division duplex TDD configuration and a second time division duplex TDD configuration to a terminal UE, so that the terminal UE divides, based on the first time division duplex TDD configuration or the second time division duplex TDD configuration, corresponding subframes into a first subframe subset, a second subframe subset, and a third subframe subset.

A quantity of DL subframes in the first TDD configuration is greater than a quantity of DL subframes in the second TDD configuration, the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group. Alternatively, DL services of the UE in the first terminal group are more than DL services of the UE in the second terminal group.

Step 502: Receive a measurement result that is obtained by the terminal by performing channel quality state measurement based on the first subframe subset, the second subframe subset, and the third subframe subset, and schedule a subframe resource according to the measurement result.

A specific implementation in which the base station instructs the terminal to select a subframe subset may be as follows:

A. Sending a corresponding terminal group identifier to the UE, where the terminal group identifier is used to identify that the UE belongs to the first terminal group or the second terminal group, so that the UE determines, from the first TDD configuration and the second TDD configuration and based on the terminal group identifier, a target TDD configuration used for dividing the subframes into the first subframe subset, the second subframe subset, and the third subframe subset, where when the UE is located in the first terminal group, the target TDD configuration is the first TDD configuration, or when the is located in the second terminal group, the target TDD configuration is the second TDD configuration.

B. Sending indication information to the UE, where the indication information is used to instruct the UE to determine, from the first TDD configuration and the second TDD configuration, a target TDD configuration used for dividing the subframes into the first subframe subset, the second subframe subset, and the third subframe subset.

Optionally, after a terminal side divides subframes into different subsets based on various parameters sent by a base station side, the terminal side performs targeted channel instruction state measurement based on characteristics of different subframe subsets. Therefore, the measurement result includes a channel quality state report and a self-interference cancellation gain that are obtained by the first terminal group and the second terminal group for the first subframe subset, the second subframe subset, and the third subframe subset.

The scheduling a subframe resource according to the measurement result includes:

selecting, by the base station, a scheduling policy with maximized spectrum resource utilization according to the received channel quality state report and self-interference cancellation gain, and scheduling the subframe resource by using the scheduling policy.

Specific measurement performed on the first subframe subset, the second subframe subset, the third subframe subset, the first terminal group, and the second terminal group includes the following.

A. Perform inter-UE interference (Inter-Ue Interference, IUI) measurement on the first subframe subset.

When a subframe corresponding to the UE in the first terminal group is used for downlink transmission, and a subframe corresponding to the UE in the second terminal group is used for uplink transmission, if the UE is configured to report IUI, reporting of the IUI may be implemented according to the following specific principles:

A1. For the UE in the first terminal group, a sounding reference signal SRS (Sounding Reference Signal, SRS), a random access (Random Access, RA) preamble, a random access preamble sequence, and a demodulation reference signal DMRS are measured in a specific subframe in the first subframe subset; and for the UE located in the second terminal group, the sounding reference signal SRS, the random access RA preamble, the random access preamble sequence, and the demodulation reference signal (De Modulation Reference Signal, DMRS) are sent in the specific subframe in the first subframe subset.

The SRS, the random access preamble, the random access preamble sequence, and the demodulation reference signal may be explicitly configured.

Alternatively, the eNB indicates only a frequency resource and a sequence that is used, but may not indicate a subframe. A subframe may be implicitly pre-learned by the UE by using a subframe subset, for example, a first subframe in the first subframe subset.

Alternatively, a resource used for an SRS/random access channel (Random Access Channel, RACH) may be implicitly linked to a terminal identifier (UE ID) allocated to the second terminal group.

A2. For the UE in the first terminal group, reference signal received quality (Reference Signal Received Quality, RSRQ) is measured in the specific subframe in the first subframe subset; and for the UE located in the second terminal group, a signal is sent in the specific subframe in the first subframe subset, for use by the UE in the first terminal group to measure a received signal strength indicator (Received Signal Strength Indication, RSSI).

The specific subframe in this embodiment may be a preset default subframe, or may be a subframe determined according to configuration information. For example, a first subframe in the first subframe subset is set as the specific subframe by default.

Optionally, when a subframe corresponding to the UE in the first terminal group is used for uplink transmission, and a subframe corresponding to the UE in the second terminal group is used for downlink transmission, if the UE is configured to report IUI, the method further includes:

A3. For the UE in the second terminal group, a sounding reference signal SRS, a random access RA preamble, a random access preamble sequence, and a demodulation reference signal DMRS are measured in a specific subframe in the first subframe subset; and for the UE located in the first terminal group, the sounding reference signal SRS, the random access RA preamble, the random access preamble sequence, and the demodulation reference signal DMRS are sent in the specific subframe in the first subframe subset; or A4. For the UE in the second terminal group, reference signal received quality RSRQ is measured in the specific subframe in the first subframe subset; and for the UE located in the first terminal group, a signal is sent in the specific subframe in the first subframe subset, for being used to measure a received signal strength indicator RSSI.

B. Perform self-interference cancellation gain reporting on the second subframe subset, where the self-interference cancellation gain is used for a full-duplex operation on a UE side; and for terminals that have a full-duplex capability and that are in the first terminal group and the second terminal group, perform self-interference cancellation gain measurement by using the second subframe subset.

When the UE is configured to report the self-interference cancellation gain measurement, the reporting a measurement result of the channel quality state measurement to an eNB may be implemented according to the following principles:

B1. For the UE in the second terminal group, self-interference cancellation gain is reported to the eNB if the reporting is triggered by the eNB.

B2. For the UE in the first terminal group, the self-interference cancellation gain is reported to the eNB when the reporting is triggered by the eNB or a report from a buffer status report BSR system is received.

B3. The self-interference cancellation gain is reported to the eNB when the UE learns a fixed value of an interference cancellation capability within a specific period.

C. Perform channel quality indicator (Channel Quality Indicator, CQI) measurement on the third subframe subset, where the CQI is used for a general half-duplex operation.

For UEs located in the two groups, measurement is restricted in the third subframe set.

In this embodiment of the present invention, because different subframe subsets have different functions, and a channel quality state measurement result fed back by the terminal is for a specific subframe and a specific group, manners of performing transmission of a scheduling grant for subframes in different subframe subsets are different. Before the scheduling a subframe resource according to the measurement result, the method further includes: transmitting a scheduling grant required for data transmission in a subframe n, where the subframe n is a subframe in the first subframe subset, and the transmitting a scheduling grant required for data transmission in a subframe n includes:

if reporting of a self-interference cancellation gain of the subframe n is triggered, and sending and receiving of a full-duplex service need to be performed in the subframe n, for the UEs in the first terminal group and the second terminal group, transmitting, in a subframe n-k, joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, joint-scheduling grant signaling is not transmitted, and an uplink service needs to be received in the subframe n, for the UE in the second terminal group, transmitting, in a subframe n-m, uplink grant signaling, where m is a positive integer greater than or equal to 1; and if reporting of a self-interference cancellation gain of the subframe n is not triggered, joint-scheduling grant signaling is not transmitted, and a downlink service needs to be transmitted in the subframe n, for the UE in the first terminal group, transmitting, in a subframe n-l, downlink grant signaling, where l is an integer greater than or equal to zero.

In this embodiment of the present invention, the terminal side performs channel quality state measurement based on different subframe subsets, and reports the measurement result to the eNB. Because the reported measurement result is based on specific subframes (the three subframe subsets) and specific groups (the first terminal group and the second terminal group), the eNB can select a scheduling policy with maximized spectrum resource utilization based on the received channel quality state report and self-interference cancellation gain, and perform corresponding scheduling, thereby maximizing spectrum resource utilization.

Embodiment 4

Figure 6:
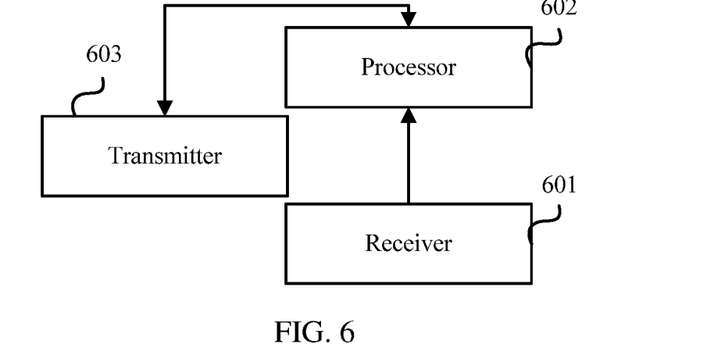
FIG. 6 is a schematic structural diagram of a terminal according to an embodiment of the present invention.

As shown in FIG. 6, this embodiment of the present invention further provides a terminal. The terminal UE includes: a receiver 601, a processor 602, and a transmitter 603.

The receiver 601 is configured to receive a first time division duplex TDD configuration and a second time division duplex TDD configuration, where a quantity of DL subframes in the first TDD configuration is greater than a quantity of DL subframes in the second TDD configuration.

Optionally, the receiver 601 may receive the first time division duplex TDD configuration and the second time division duplex TDD configuration by using broadcast signaling.

The processor 602 is configured to: determine, from the first TDD configuration and the second TDD configuration, a target TDD configuration corresponding to the terminal; divide, based on the target TDD configuration, subframes corresponding to the UE into a first subframe subset, a second subframe subset, and a third subframe subset; and perform channel quality state measurement based on the first subframe subset, the second subframe subset, and the third subframe subset.

The first subframe subset includes subframes that are opposite to directions of links corresponding to UEs in a first terminal group and a second terminal group; the second subframe subset includes uplink subframes corresponding to the UEs in the first terminal group and the second terminal group; and the third subframe subset includes downlink subframes corresponding to the UEs in the first terminal group and the second terminal group. DL services of the UE in the first terminal group are more than DL services of the UE in the second terminal group.

The transmitter 603 is configured to report a measurement result of the channel quality state measurement to an eNB, so that the eNB schedules a subframe resource according to the measurement result.

Optionally, the processor 602 is further configured to: divide, according to identification based on the target TDD configuration, the subframes corresponding to the terminal into the first subframe subset, the second subframe subset, and the third subframe subset, where the target TDD configuration identifies a subframe subset corresponding to each of the subframes corresponding to the UE; or divide, according to the target TDD configuration and a preset rule, the subframes corresponding to the UE into the first subframe subset, the second subframe subset, and the third subframe subset.

In addition, the terminal may determine the target TDD configuration by using identification sent by a base station side. In this case, the receiver 601 is further configured to receive a terminal group identifier, where the terminal group identifier is used to identify that the terminal belongs to a first terminal group or a second terminal group.

The processor 602 is further configured to determine, from the first TDD configuration and the second TDD configuration and based on the terminal group identifier, the target TDD configuration corresponding to the UE.

A specific implementation in which the processor determines the target TDD configuration may be as follows:

The processor 602 is further configured to determine, based on the terminal group identifier, that the UE is located in the first terminal group or the second terminal group, where when the UE is located in the first terminal group, the target TDD configuration is the first TDD configuration, or when the UE is located in the second terminal group, the target TDD configuration is the second TDD configuration.

Because different subframe subsets are applicable to different parameter measurement, when the channel quality state measurement is being performed, a specific implementation may be as follows:

That the processor 602 is configured to perform channel quality state measurement based on the first subframe subset, the second subframe subset, and the third subframe subset specifically includes:

performing inter-UE interference IUI measurement on the first subframe subset;

performing self-interference cancellation gain measurement on the second subframe subset, where the self-interference cancellation gain is used for a full-duplex operation on a UE side; and performing channel quality indicator CQI measurement on the third subframe subset, where the CQI is used for a general half-duplex operation.

A specific implementation of performing the inter-UE interference IUI measurement may be as follows:

The processor 602 is further configured to: for terminals that have a full-duplex capability and that are in the first terminal group and the second terminal group, perform self-interference cancellation gain measurement by using a specific subframe in the second subframe subset.

Optionally, a specific time of reporting the measurement result may be as follows:

The transmitter 603 is further configured to: when the UE is configured to report the self-interference cancellation gain measurement, for the UE in the second terminal group, report the self-interference cancellation gain to the eNB if the reporting is triggered by the eNB; for the UE in the first terminal group, report the self-interference cancellation gain to the eNB when the reporting is triggered by the eNB or a report from a buffer status report BSR system is received; and report the self-interference cancellation gain to the eNB when the terminal learns a fixed value of an interference cancellation capability within a specific period.

Reporting of the IUI may be as follows:

Manner 1: The transmitter 603 is further configured to: when a subframe corresponding to the UE in the first terminal group is used for downlink transmission, and a subframe corresponding to the UE in the second terminal group is used for uplink transmission, if the UE is configured to report IUI, for the UE in the first terminal group, measure, in a specific subframe in the first subframe subset, a sounding reference signal SRS, a random access RA preamble, a random access preamble sequence, and a demodulation reference signal DMRS; and for the UE located in the second terminal group, send, in the specific subframe in the first subframe subset, the sounding reference signal SRS, the random access RA preamble, the random access preamble sequence, and the demodulation reference signal DMRS; or for the UE in the first terminal group, measure, in the specific subframe in the first subframe subset, reference signal received quality RSRQ; and for the UE located in the second terminal group, send, in the specific subframe in the first subframe subset, a signal to measure a received signal strength indicator RSSI.

Manner 2: The transmitter 603 is further configured to: when a subframe corresponding to the UE in the first terminal group is used for uplink transmission, and a subframe corresponding to the UE in the second terminal group is used for downlink transmission, if the UE is configured to report IUI, for the UE in the second terminal group, measure, in a specific subframe in the first subframe subset, a sounding reference signal SRS, a random access RA preamble, a random access preamble sequence, and a demodulation reference signal DMRS; and for the UE located in the first terminal group, send, in the specific subframe in the first subframe subset, the sounding reference signal SRS, the random access RA preamble, the random access preamble sequence, and the demodulation reference signal DMRS; or for the UE in the second terminal group, measure, in the specific subframe in the first subframe subset, reference signal received quality RSRQ; and for the UE located in the first terminal group, send, in the specific subframe in the first subframe subset, a signal to measure a received signal strength indicator RSSI.

In the foregoing parameter reporting, a specific subframe is used. In this embodiment, the transmitter 603 is further configured to use a preset default subframe or a subframe determined according to configuration information, as the specific subframe.

Further, after the base station schedules the resource according to the measurement result, the processor 602 is further configured to detect a scheduling grant required for data transmission in a subframe n, where the subframe n is a subframe in the first subframe subset, and the detection includes:

if reporting of a self-interference cancellation gain of the subframe n is triggered, for the terminals in the first terminal group and the second terminal group, detecting, in a subframe n-k, whether there is joint-scheduling grant signaling; and if the joint-scheduling grant signaling is detected, performing, on a resource allocated in the subframe n, sending and receiving of a full-duplex service based on the detected joint-scheduling grant signaling, where the joint-scheduling grant signaling is used for uplink and downlink scheduling in a full-duplex operation, and k is a positive integer greater than or equal to 1; or if reporting of a self-interference cancellation gain of the subframe n is not triggered, and no subframe is scheduled by using joint-scheduling grant signaling, for the terminal in the second terminal group, detecting, in a subframe n-m, whether there is uplink grant signaling; and if the uplink grant signaling is detected, sending, on a resource allocated in the subframe n, an uplink service based on the detected uplink grant signaling, where m is a positive integer greater than or equal to 1; and if reporting of a self-interference cancellation gain of the subframe n is not triggered, and no subframe is scheduled by using the joint-scheduling grant signaling, for the terminal in the first terminal group, detecting, in a subframe n-l, whether there is downlink grant signaling; and if the downlink grant signaling is detected, receiving, on a resource allocated in the subframe n, a downlink service based on the detected downlink grant signaling, where l is an integer greater than or equal to zero.

Embodiment 5

Figure 7:
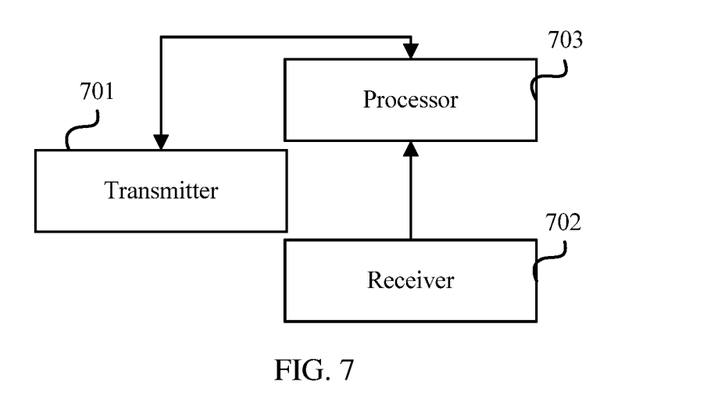
FIG. 7 is a schematic structural diagram of a base station according to an embodiment of the present invention.

As shown in FIG. 7, this embodiment of the present invention further provides a base station. The base station includes:

a transmitter 701, configured to send a first time division duplex TDD configuration and a second time division duplex TDD configuration to a terminal UE, so that the terminal UE divides, based on the first time division duplex TDD configuration or the second time division duplex TDD configuration, corresponding subframes into a first subframe subset, a second subframe subset, and a third subframe subset, where a quantity of DL subframes in the first TDD configuration is greater than a quantity of DL subframes in the second TDD configuration, the first subframe subset includes subframes that are opposite to directions of links corresponding to UEs in a first terminal group and a second terminal group, the second subframe subset includes uplink subframes corresponding to the UEs in the first terminal group and the second terminal group, and the third subframe subset includes downlink subframes corresponding to the UEs in the first terminal group and the second terminal group; and DL services of the UE in the first terminal group are more than DL services of the UE in the second terminal group;

a receiver 702, configured to receive a measurement result that is obtained by the terminal by performing channel quality state measurement based on the first subframe subset, the second subframe subset, and the third subframe subset; and a processor 703, configured to schedule a subframe resource according to the measurement result.

Optionally, the transmitter 701 is further configured to send a corresponding terminal group identifier to the UE, where the terminal group identifier is used to identify that the UE belongs to the first terminal group or the second terminal group, so that the UE determines, from the first TDD configuration and the second TDD configuration and based on the terminal group identifier, a target TDD configuration used for dividing the subframes into the first subframe subset, the second subframe subset, and the third subframe subset, where when the UE is located in the first terminal group, the target TDD configuration is the first TDD configuration, or when the is located in the second terminal group, the target TDD configuration is the second TDD configuration.

Optionally, the transmitter 701 is further configured to send indication information to the UE, where the indication information is used to instruct the UE to determine, from the first TDD configuration and the second TDD configuration, a target TDD configuration used for dividing the subframes into the first subframe subset, the second subframe subset, and the third subframe subset.

Optionally, the measurement result includes a channel quality state report and a self-interference cancellation gain that are obtained by the first terminal group and the second terminal group for the first subframe subset, the second subframe subset, and the third subframe subset.

The processor 703 is specifically configured to: select a scheduling policy with maximized spectrum resource utilization according to the received channel quality state report and self-interference cancellation gain, and schedule the subframe resource by using the scheduling policy.

Specific measurement performed on the first subframe subset, the second subframe subset, the third subframe subset, the first terminal group, and the second terminal group includes the following.

A. Perform inter-UE interference (Inter-Ue Interference, IUI) measurement on the first subframe subset.

When a subframe corresponding to the UE in the first terminal group is used for downlink transmission, and a subframe corresponding to the UE in the second terminal group is used for uplink transmission, if the UE is configured to report IUI, reporting of the IUI may be implemented according to the following specific principles:

A1. For the UE in the first terminal group, a sounding reference signal SRS (Sounding Reference Signal, SRS), a random access (Random Access, RA) preamble, a random access preamble sequence, and a demodulation reference signal DMRS are measured in a specific subframe in the first subframe subset; and for the UE located in the second terminal group, the sounding reference signal SRS, the random access RA preamble, the random access preamble sequence, and the demodulation reference signal (De Modulation Reference Signal, DMRS) are sent in the specific subframe in the first subframe subset.

The SRS, the random access preamble, the random access preamble sequence, and the demodulation reference signal may be explicitly configured.

Alternatively, the eNB indicates only a frequency resource and a sequence that is used, but may not indicate a subframe. A subframe may be implicitly pre-learned by the UE by using a subframe subset, for example, a first subframe in the first subframe subset.

Alternatively, a resource used for an SRS/random access channel (Random Access Channel, RACH) may be implicitly linked to a terminal identifier (UE ID) allocated to the second terminal group.

A2. For the UE in the first terminal group, reference signal received quality (Reference Signal Received Quality, RSRQ) is measured in the specific subframe in the first subframe subset; and for the UE located in the second terminal group, a signal is sent in the specific subframe in the first subframe subset, for use by the UE in the first terminal group to measure a received signal strength indicator (Received Signal Strength Indication, RSSI).

The specific subframe in this embodiment may be a preset default subframe, or may be a subframe determined according to configuration information. For example, a first subframe in the first subframe subset is set as the specific subframe by default.

Optionally, when a subframe corresponding to the UE in the first terminal group is used for uplink transmission, and a subframe corresponding to the UE in the second terminal group is used for downlink transmission, if the UE is configured to report IUI, the method further includes:

A3. For the UE in the second terminal group, a sounding reference signal SRS, a random access RA preamble, a random access preamble sequence, and a demodulation reference signal DMRS are measured in a specific subframe in the first subframe subset; and for the UE located in the first terminal group, the sounding reference signal SRS, the random access RA preamble, the random access preamble sequence, and the demodulation reference signal DMRS are sent in the specific subframe in the first subframe subset; or A4. For the UE in the second terminal group, reference signal received quality RSRQ is measured in the specific subframe in the first subframe subset; and for the UE located in the first terminal group, a signal is sent in the specific subframe in the first subframe subset, for being used to measure a received signal strength indicator RSSI.

B. Perform self-interference cancellation gain reporting on the second subframe subset, where the self-interference cancellation gain is used for a full-duplex operation on a UE side; and for terminals that have a full-duplex capability and that are in the first terminal group and the second terminal group, perform self-interference cancellation gain measurement by using the second subframe subset.

When the UE is configured to report the self-interference cancellation gain measurement, the reporting a measurement result of the channel quality state measurement to an eNB may be implemented according to the following principles:

B1. For the UE in the second terminal group, self-interference cancellation gain is reported to the eNB if the reporting is triggered by the eNB.

B2. For the UE in the first terminal group, the self-interference cancellation gain is reported to the eNB when the reporting is triggered by the eNB or a report from a buffer status report BSR system is received.

B3. The self-interference cancellation gain is reported to the eNB when the UE learns a fixed value of an interference cancellation capability within a specific period.

C. Perform channel quality indicator (Channel Quality Indicator, CQI) measurement on the third subframe subset, where the CQI is used for a general half-duplex operation.

For UEs located in the two groups, measurement is restricted in the third subframe set.

Optionally, the processor 703 is further configured to: before scheduling the subframe resource according to the measurement result, transmit a scheduling grant required for data transmission in a subframe n, where the subframe n is a subframe in the first subframe subset, and that the processor is configured to transmit a scheduling grant required for data transmission in a subframe n includes:

the processor 703 is configured to: if it is determined that reporting of a self-interference cancellation gain of the subframe n is triggered, and sending and receiving of a full-duplex service need to be performed in the subframe n, for the UEs in the first terminal group and the second terminal group, the transmitter 701 is further configured to transmit, in a subframe n-k, joint-scheduling grant signaling, where the joint-scheduling grant signaling is used for uplink and downlink scheduling in a full-duplex operation, and k is a positive integer greater than or equal to 1; or the processor 703 is configured to: if it is determined that reporting of a self-interference cancellation gain of the subframe n is not triggered, joint-scheduling grant signaling is not transmitted, and an uplink service needs to be received in the subframe n, for the UE in the second terminal group, the transmitter 701 is further configured to transmit, in a subframe n-m, uplink grant signaling, where m is a positive integer greater than or equal to 1; and the processor 703 is configured to: if it is determined that reporting of a self-interference cancellation gain of the subframe n is not triggered, joint-scheduling grant signaling is not transmitted, and a downlink service needs to be transmitted in the subframe n, for the UE in the first terminal group, the transmitter 701 is further configured to transmit, in a subframe n-l, downlink grant signaling, where l is an integer greater than or equal to zero.

In this embodiment of the present invention, the terminal side performs channel quality state measurement based on different subframe subsets, and reports the measurement result to the eNB. Because the reported measurement result is based on specific subframes (the three subframe subsets) and specific groups (the first terminal group and the second terminal group), the eNB can select a scheduling policy with maximized spectrum resource utilization based on the received channel quality state report and self-interference cancellation gain, and perform corresponding scheduling, thereby maximizing spectrum resource utilization.

The foregoing one or more technical solutions in the embodiments of this application have at least the following technical effects.

The resource scheduling method provided in the embodiments of the present invention is based on an eNB/UE capability, a flow condition, and interference, so that the eNB implements adaptive resource sharing, thereby improving resource utilization.

In addition, the eNB collects necessary information, estimates all possible options for resource sharing, and reduces scheduling complexity and minimizes reporting and blind detection of the UE.

In the method provided in the embodiments of the present invention, terminals are divided into groups, so that scheduling on an eNB side is simplified. For example, the eNB may consider to match, in the first subframe subset, one UE from the second terminal group with one UE from the first terminal group, to be used for a full-duplex operation on the eNB side, instead of performing selection by matching all UEs.

Measurement/reporting based on subframe subsets simplifies measurement/reporting configuration, and reduces unnecessary reporting. For example, after the terminal obtains the three subframe subsets, the UE may determine a subframe subset on which measurement of a CQI, IUI, and a cancellation gain (Cancellation gain, CG) is to be performed. For a UE in the second terminal group, it is assumed that the UE has many uplink services, and does not know when there is a downlink service. When there is only an uplink service, a full-duplex operation does not need to be performed on the UE side. Therefore, a self-interference cancellation gain does not need to be reported, so as to reduce unnecessary reporting.

In the present invention, the self-interference cancellation gain is reported only when the reporting is triggered by the eNB. In any case, for the UE in the first terminal group that has a downlink service, when there is an uplink service, the UE knows about it and reports a self-interference cancellation gain to the eNB, and carries a BSR of the uplink service, so as to enable a full-duplex operation on a UE side, thereby saving resources.

When matching DL UE and UL UE on a same resource, the eNB needs to evaluate inter-UE interference. This is implemented by means of measurement on the first subframe subset. The measurement may be restricted to a specific subframe that is in the subset and that is known to both the eNB and the UE. UEs in different groups perform different operations on the subframe. The UE in the second terminal group sends, on a configured resource, an SRS/RACH, and the UE in the first terminal group measures the SRS/RACH to estimate inter-UE interference, and reports the inter-UE interference to the eNB.

To simplify operations of the UE, there are some rules for detection of a scheduling grant. For example, if the UE located in a GU group reports a self-interference cancellation gain (reporting is triggered by the eNB), it means that there may be a full-duplex operation in the first subframe subset. In this case, if no self-interference cancellation is reported, the UE tries its best to detect, in a subframe in the first subframe subset, a DL-UL joint-scheduling grant. Alternatively, if the UE cannot perform full duplexing, the detection is not required.

The methods described in the present invention are not limited to the embodiments described in the Description of Embodiments. Another implementation obtained by a person skilled in the art according to the technical solutions of the present invention still belongs to a technical innovation scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A resource scheduling method, wherein the method comprises:
    receiving, by a terminal (UE), a first time division duplex (TDD) configuration and a second TDD configuration, wherein a quantity of downlink (DL) subframes in the first TDD configuration is greater than a quantity of DL subframes in the second TDD configuration;
    receiving, by the UE, a terminal group identifier for identifying that the UE belongs to a first terminal group or a second terminal group;
    determining, from the first TDD configuration and the second TDD configuration and based on the terminal group identifier, a target TDD configuration corresponding to the UE;
    dividing, based on the target TDD configuration, subframes corresponding to the UE into a first subframe subset, a second subframe subset, and a third subframe subset, wherein the first subframe subset comprises subframes that are configured for different communications links for UEs in the first terminal group and the second terminal group, the second subframe subset comprises uplink subframes corresponding to the UEs in the first terminal group and the second terminal group, and the third subframe subset comprises DL subframes corresponding to the UEs in the first terminal group and the second terminal group, and wherein DL services of the UE in the first terminal group are more than DL services of the UE in the second terminal group; and
    performing channel quality state measurement based on the first subframe subset, the second subframe subset, and the third subframe subset, and reporting a measurement result of the channel quality state measurement to an evolved NodeB (eNB) for scheduling a subframe resource according to the measurement result, wherein performing the channel quality state measurement comprises:
        performing inter-UE interference (IUI) measurement on the first subframe subset;
        performing self-interference cancellation gain measurement on the second subframe subset, wherein the self-interference cancellation gain is used for a full-duplex operation on a UE side; and
        performing channel quality indicator (CQI) measurement on the third subframe subset, wherein the CQI is used for a general half-duplex operation.

2. The method according to claim 1, wherein receiving the first TDD configuration and the second TDD configuration comprises:
    receiving, by the UE, the first TDD configuration and the second TDD configuration by using broadcast signaling.

3. The method according to claim 1, wherein dividing, based on the target TDD configuration, subframes corresponding to the UE into a first subframe subset, a second subframe subset, and a third subframe subset comprises:
    identifying, by using the target TDD configuration, a subframe subset corresponding to each of the subframes corresponding to the UE, and dividing, according to the identification based on the target TDD configuration, the subframes corresponding to the UE into the first subframe subset, the second subframe subset, and the third subframe subset; or
    dividing, by the UE according to the target TDD configuration and a preset rule, the subframes corresponding to the UE into the first subframe subset, the second subframe subset, and the third subframe subset.

4. The method according to claim 1, wherein determining the target TDD configuration corresponding to the UE comprises:
    determining, based on the terminal group identifier, that the UE is located in the first terminal group or the second terminal group, wherein when the UE is located in the first terminal group, the target TDD configuration is the first TDD configuration, or when the UE is located in the second terminal group, the target TDD configuration is the second TDD configuration.

5. The method according to claim 1, wherein the method comprises:
    for terminals that have a full-duplex capability and that are in the first terminal group and the second terminal group, performing self-interference cancellation gain measurement by using a specific subframe in the second subframe subset.

6. A resource scheduling method, wherein the method comprises:
    sending, by a base station, a first time division duplex (TDD) configuration and a second TDD configuration to a terminal UE for dividing, based on the first TDD configuration or the second TDD configuration, corresponding subframes into a first subframe subset, a second subframe subset, and a third subframe subset, wherein a quantity of downlink (DL) subframes in the first TDD configuration is greater than a quantity of DL subframes in the second TDD configuration, the first subframe subset comprises subframes that are configured for different communications links for UEs in a first terminal group and a second terminal group, the second subframe subset comprises uplink subframes corresponding to the UEs in the first terminal group and the second terminal group, and the third subframe subset comprises DL subframes corresponding to the UEs in the first terminal group and the second terminal group, and wherein DL services of the UE in the first terminal group are more than DL services of the UE in the second terminal group;

sending a corresponding terminal group identifier to the UE for identifying that the UE belongs to the first terminal group or the second terminal group and for determining, from the first TDD configuration and the second TDD configuration and based on the terminal group identifier, a target TDD configuration used for dividing the subframes into the first subframe subset, the second subframe subset, and the third subframe subset, wherein when the UE is located in the first terminal group, the target TDD configuration is the first TDD configuration, or when the UE is located in the second terminal group, the target TDD configuration is the second TDD configuration;

sending indication information to the UE for instructing the UE to determine, from the first TDD configuration and the second TDD configuration, the target TDD configuration; and receiving a measurement result from the terminal that corresponds to a channel quality state measurement based on the first subframe subset, the second subframe subset, and the third subframe subset, and scheduling a subframe resource according to the measurement result, wherein performing the channel quality state measurement comprises:
   performing inter-UE interference (IUI) measurement on the first subframe subset;
   performing self-interference cancellation gain measurement on the second subframe subset, wherein the self-interference cancellation gain is used for a full-duplex operation on a UE side; and
   performing channel quality indicator (CQI) measurement on the third subframe subset, wherein the CQI is used for a general half-duplex operation.

7. A terminal (UE), comprising:
a receiver, configured to:
   receive a first time division duplex (TDD) configuration and a second TDD configuration, wherein a quantity of downlink (DL) subframes in the first TDD configuration is greater than a quantity of DL subframes in the second TDD configuration; and
   receive a terminal group identifier for identifying that the UE belongs to a first terminal group or a second terminal group;
at least one processor, configured to:
   determine, from the first TDD configuration and the second TDD configuration and based on the terminal group identifier, a target TDD configuration corresponding to the UE;
   divide, based on the target TDD configuration, subframes corresponding to the UE into a first subframe subset, a second subframe subset, and a third subframe subset; and perform channel quality state measurement based on the first subframe subset, the second subframe subset, and the third subframe subset, wherein the first subframe subset comprises subframes that are configured for different communications links for UEs in the first terminal group and the second terminal group, the second subframe subset comprises uplink subframes corresponding to the UEs in the first terminal group and the second terminal group, and the third subframe subset comprises DL subframes corresponding to the UEs in the first terminal group and the second terminal group, wherein DL services of the UE in the first terminal group are more than DL services of the UE in the second terminal group, and wherein to perform the channel quality state measurement based on the first subframe subset, the second subframe subset, and the third subframe subset, the at least one processor is configured to:
   perform inter-UE interference (IUI) measurement on the first subframe subset;
   perform self-interference cancellation gain measurement on the second subframe subset, wherein the self-interference cancellation gain is used for a full-duplex operation on a UE side; and
   perform channel quality indicator (CQI) measurement on the third subframe subset, wherein the CQI is used for a general half-duplex operation; and
a transmitter, configured to report a measurement result of the channel quality state measurement to an evolved NodeB (eNB) for scheduling a subframe resource according to the measurement result.

8. The terminal according to claim 7, wherein the receiver is configured to receive the first TDD configuration and the second TDD configuration by using broadcast signaling.

9. The terminal according to claim 7, wherein the at least one processor is further configured to:
   divide, according to identification based on the target TDD configuration, the subframes corresponding to the terminal into the first subframe subset, the second subframe subset, and the third subframe subset, wherein the target TDD configuration identifies a subframe subset corresponding to each of the subframes corresponding to the UE; or
   divide, according to the target TDD configuration and a preset rule, the subframes corresponding to the UE into the first subframe subset, the second subframe subset, and the third subframe subset.

10. The terminal according to claim 7, wherein the at least one processor is further configured to determine, based on the terminal group identifier, that the UE is located in the first terminal group or the second terminal group, wherein when the UE is located in the first terminal group, the target TDD configuration is the first TDD configuration, or when the UE is located in the second terminal group, the target TDD configuration is the second TDD configuration.

11. The terminal according to claim 7, wherein the at least one processor is further configured to:
   for terminals that have a full-duplex capability and that are in the first terminal group and the second terminal group, perform self-interference cancellation gain measurement by using a specific subframe in the second subframe subset.

* * * * *

UNITED STATES PATENT AND TRADEMARK OFFICE
CERTIFICATE OF CORRECTION

PATENT NO. : 10,952,227 B2  
APPLICATION NO. : 15/578682  
DATED : March 16, 2021  
INVENTOR(S) : Lili Zhang, Richard Stirling-Gallacher and Bin Liu Page 1 of 1

It is certified that error appears in the above-identified patent and that said Letters Patent is hereby corrected as shown below:

In the Claims

Column 28 Line 63, In Claim 6, delete "UE" and insert --(UE)--, therefor.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*